(12) United States Patent
Nakajima et al.

(10) Patent No.: US 7,595,906 B2
(45) Date of Patent: *Sep. 29, 2009

(54) CALIBRATION METHOD FOR DENSITY IN IMAGE FORMING APPARATUS

(75) Inventors: Nobuyuki Nakajima, Kanagawa (JP); Masakazu Tsuchia, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 337 days.

This patent is subject to a terminal disclaimer.

(21) Appl. No.: 11/422,383

(22) Filed: Jun. 6, 2006

(65) Prior Publication Data

US 2007/0182996 A1    Aug. 9, 2007

Related U.S. Application Data

(62) Division of application No. 10/046,578, filed on Jan. 16, 2002, now Pat. No. 7,061,648.

(30) Foreign Application Priority Data

Jan. 17, 2001    (JP)    ............... 2001-009192

(51) Int. Cl.
    *G06K 15/00*    (2006.01)
    *G06F 3/12*    (2006.01)
(52) U.S. Cl. ...................... 358/1.15; 358/1.9
(58) Field of Classification Search .............. 358/1.1, 358/1.9, 3.23, 1.13, 1.15, 504, 518; 382/162, 382/165, 167
    See application file for complete search history.

(56) References Cited

U.S. PATENT DOCUMENTS

| | | | |
|---|---|---|---|
| 5,457,541 A * | 10/1995 | Burns .................. | 358/3.21 |
| 5,649,073 A | 7/1997 | Knox et al. ............ | 358/1.9 |
| 5,731,884 A | 3/1998 | Inoue ................... | 358/3.06 |
| 5,760,920 A | 6/1998 | Lin et al. ............... | 358/3.2 |
| 5,936,741 A * | 8/1999 | Burns ................... | 358/1.9 |
| 5,953,498 A | 9/1999 | Samworth .............. | 358/1.9 |
| 6,349,185 B1 | 2/2002 | Burkes et al. .......... | 399/49 |
| 6,411,318 B1 * | 6/2002 | Sawano et al. ......... | 347/188 |
| 6,435,654 B1 | 8/2002 | Wang et al. ............ | 347/43 |
| 6,603,566 B1 | 8/2003 | Shono .................. | 358/1.13 |
| 6,616,262 B2 | 9/2003 | Nakajima et al. ....... | 347/19 |

(Continued)

FOREIGN PATENT DOCUMENTS

JP    9-187998    7/1997

(Continued)

*Primary Examiner*—Gabriel I Garcia
(74) *Attorney, Agent, or Firm*—Fitzpatrick, Cella, Harper & Scinto

(57) ABSTRACT

Calibration associated with output density correction of a printer is effected by software calibration manipulated by the user and device calibration automatically performed by the printer, and, regarding these calibrations, high accurate calibration in which dither patterns for binarizing processing are matched to each other is effected.

In a system in which either one of halftone patterns A, B, C and D as dither patterns can be used, regarding fewer number of patterns A and B, second calibration tables are created by correcting first calibration tables based on the software calibration by using correction data of engine characteristics based on the device calibration. Among the usable halftone patterns, the calibration table corresponding to the pattern A or B is selected in accordance with the set halftone pattern, and the output density correction by using the selected table.

6 Claims, 14 Drawing Sheets

U.S. PATENT DOCUMENTS

| | | | |
|---|---|---|---|
| 6,775,029 B1 | 8/2004 | Wen et al. | 358/1.9 |
| 6,788,431 B1 | 9/2004 | Yamaguchi | 358/1.9 |
| 6,906,828 B2 * | 6/2005 | VanDuyn et al. | 358/2.1 |
| 6,909,814 B1 | 6/2005 | Nakajima | 382/274 |
| 7,061,648 B2 * | 6/2006 | Nakajima et al. | 358/1.9 |
| 7,142,332 B2 * | 11/2006 | Degani et al. | 358/3.1 |

FOREIGN PATENT DOCUMENTS

JP     2000-101836     4/2000

* cited by examiner

FIG. 9
| HALF TONE PATTERN | A | B | C | D |
|---|---|---|---|---|
| OPTIMAL CALIBRATION TABLE | CALIBRATION TABLE A | CALIBRATION TABLE B | CALIBRATION TABLE A | CALIBRATION TABLE B |
FIG. 10A
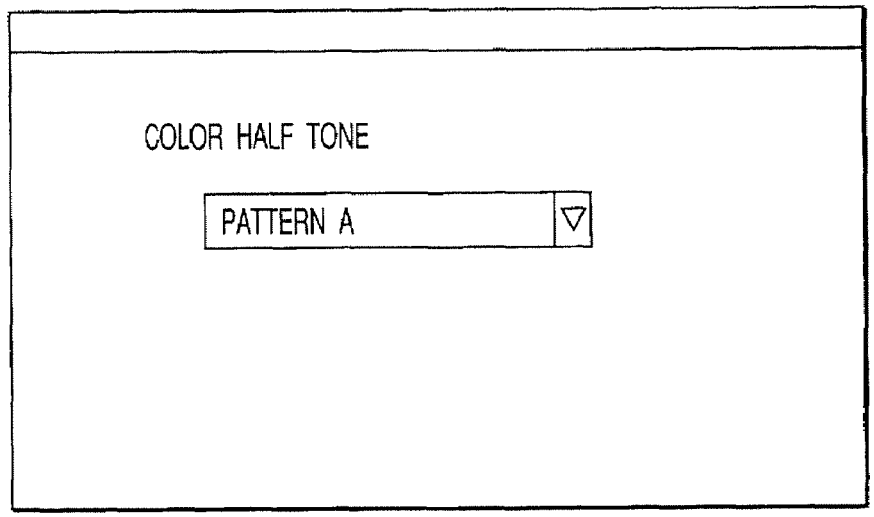
FIG. 10B
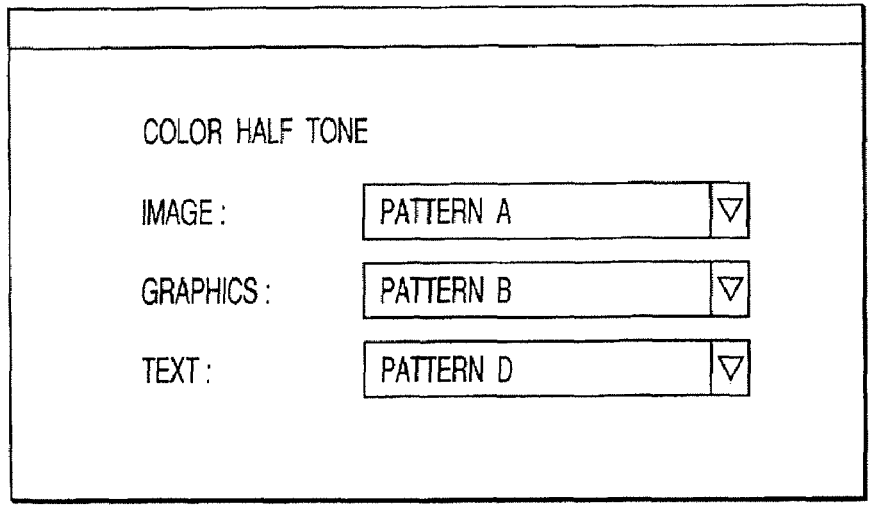

FIG. 13A
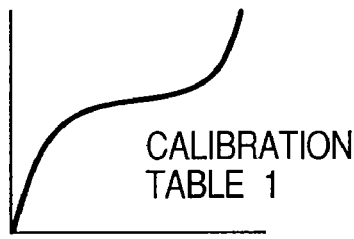
FIG. 13B
C, M, Y, K MAXIMUM DENSITY ADJUSTMENT
ENGINE CHARACTERISTICS 2 ACQUISITION
FIG. 13C
CALIBRATION TABLE
CORRECTION DATA
= ENGINE CHARACTERISTICS 2
 − ENGINE CHARACTERISTICS 1
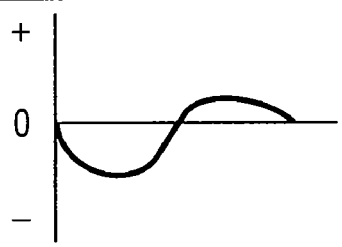 ⊕ MARGE 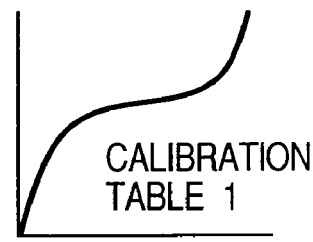
FIG. 13D
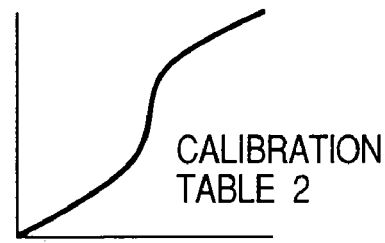

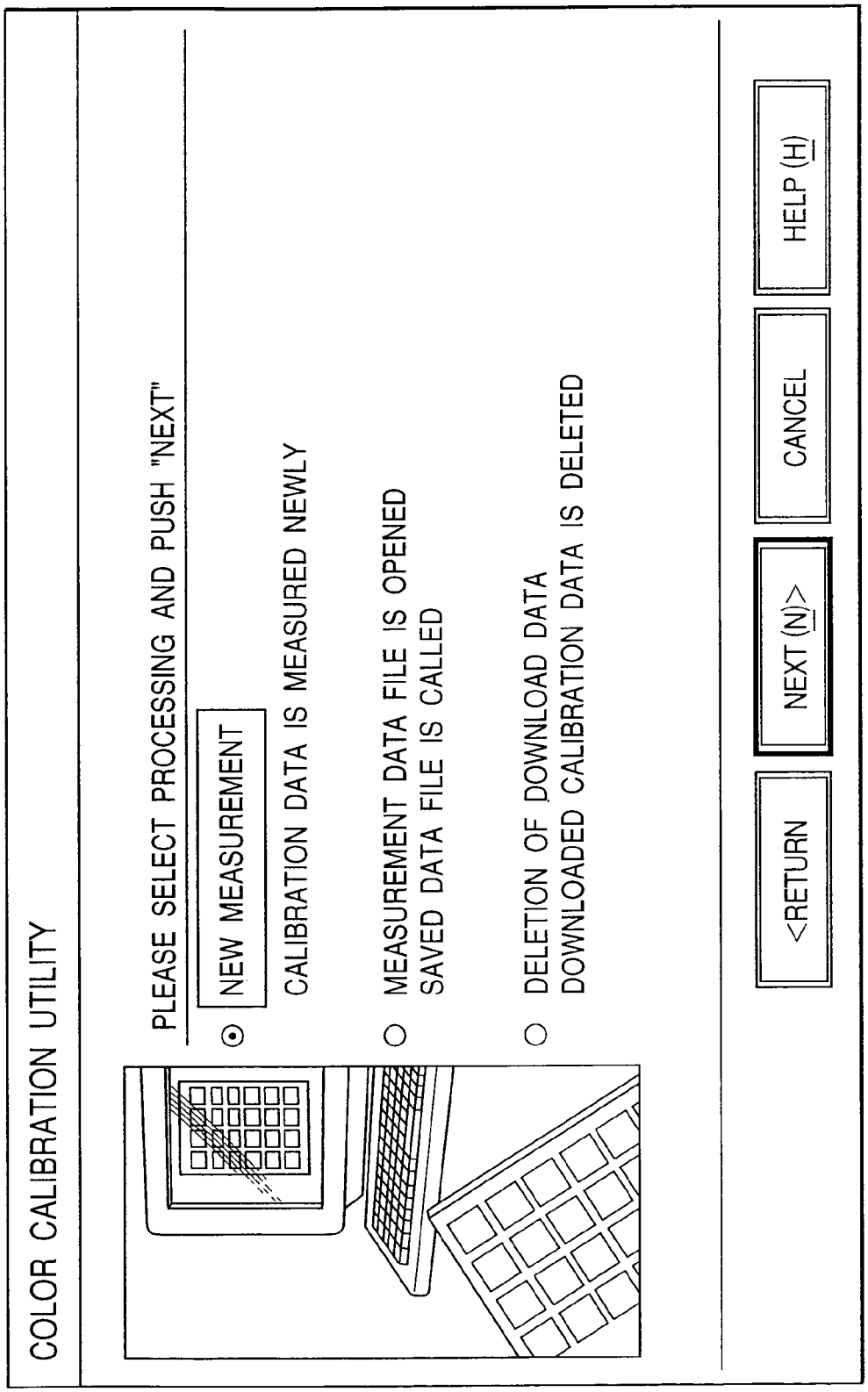

CALIBRATION METHOD FOR DENSITY IN IMAGE FORMING APPARATUS

RELATED APPLICATIONS

This application is a divisional of application Ser. No. 10/046,578, filed Jan. 16, 2002, and claims benefit of that filing date, as well as benefit of the filing date of Japanese Patent Application No. 2001-009192, filed Jan. 17, 2001. The entire contents of both of those applications is hereby incorporated herein by reference.

BACKGROUND OF THE INVENTION

1. Field of the Invention

The present invention relates to a calibration method for maintaining a print density characteristics constant in an image forming apparatus.

2. Related Background Art

In color printers, copying machines and print apparatuses for printing characters and/or images on a print medium such as a paper, in general, it is known that print output characteristics such as gradation, density and the like in a print result may be varied with change in print environments and/or time-lapse change of the apparatus itself.

The print environments may, for example, include temperature and humidity of an atmosphere into which the apparatus is installed, and, if such print environment is changed, an amount of toner adhered to the print medium may be changed in electrophotographic systems or an ink discharged amount may be changed in ink jet systems, with the result that desired output characteristics may not be obtained. Further, when a printing operation is continued for a relatively long term, a temperature within the apparatus may be changed, thereby changing the output characteristics. Furthermore, the output characteristics may be varied with a toner remaining amount.

On the other hand, in the time-lapse change, while depending upon frequency of use of the print apparatus, when the apparatus has been used for a relatively long term, characteristics of various parts of the apparatus such as a charging property of a photosensitive drum are changed, with the result that the output characteristics are changed.

In a case where a plurality of print apparatuses are used via a network as is in information processing systems, the change in the print characteristics of various print apparatuses causes another problem. That is to say, if the output characteristics are changed due to the above-mentioned factors, difference in output characteristics between the plural print apparatuses may occur. In such a case, not only the desired print characteristics cannot be obtained in the respective print apparatuses, but also, if a different printer is selected in the system, the print result will also be differentiated.

To solve the above-mentioned problems regarding the print output characteristics, generally, it is known to perform calibration. There are two general methods for performing the calibration. In one method, the calibration is effected in such a manner that a predetermined patch pattern (measuring pattern image) is outputted from the print apparatus to be calibrated and is read by a scanner or the like and calibration data is created on the basis of a read result. In the other method, the calibration is effected individually in the print apparatus. For example, the calibration is effected in such a manner that a patch pattern is formed on a photosensitive drum at a predetermined timing of the apparatus and density of the patch pattern is read by a sensor disposed in the vicinity of the drum and calibration data is created on the basis of density data. Incidentally, in the above-mentioned two methods, more specifically, the creation of the calibration data is effected to create data for renewing or updating contents of a gamma correction table in image processing.

As the former calibration method, the Inventors have proposed calibration effected between host computers constituting a system and a color printer. This calibration utilizes an operation of the user. More specifically, the patch pattern is printed out from the color printer on the basis of instruction from a server computer among plural computers constituting the system and the patch pattern is read by a scanner. In the server computer, the calibration data is created on the basis of the read scan data and the created calibration data is downloaded to the color printer. And, in the color printer, for example, gamma correction is effected by using a gamma correction table updated by the downloaded calibration data and the printing is performed on the basis of the data.

As a result, dispersion in print output characteristics between the plural print apparatuses can be reduced. Thus, for example, difference in output density characteristics between the respective print apparatuses can be eliminated to determine output density characteristic common to the plural print apparatuses, thereby stabilizing absolute density. Incidentally, the above-mentioned calibration is refereed to as "software calibration" hereinafter.

On the other hand, as the latter calibration method, the Inventors have proposed the following technique.

That is to say, in a printer engine of the print apparatus, after maximum output densities of cyan (C), magenta (M), yellow (Y) and black (K) colors are corrected at predetermined timings, engine characteristics information is obtained.

Then, a printer controller creates the calibration data on the basis of the engine characteristics information transferred from the printer engine. Then, the printer engine can perform the printing on the basis of print data corrected by using the calibration data updated by such production. According to such calibration data, particularly, change in relatively short time print output characteristics (i.e., change in output characteristics dues to change in temperature, humidity and the like) which may occur in the print apparatus can be suppressed.

The calibration of this type serves to eliminate change in output density characteristics caused in the respective print apparatuses, thereby stabilizing relative density other than the above-mentioned absolute density. Incidentally, in the following description, such calibration is also referred to as "device calibration".

By the way, the above-mentioned two calibration types can function individually, and, if there is no correlation between them, the following problem will arise. For example, in accordance with the user's instruction, even when the software calibration is effected at a certain timing, since the device calibration is generated at the predetermined timing individually determined in the print apparatus, the output characteristics of the printer engine are changed due to the device calibration, with the result that the effect of the software calibration is not maintained. In this case, particularly, the print result having the stable absolute density cannot be obtained. Thus, in order to obtain such print result, the user must perform the software calibration frequently.

Thus, as disclosed in U.S. Patent Application No. 923992 according to the Applicant, it is considered that execution of the software calibration is correlated with execution of the device calibration and data for correcting the result of the software calibration in accordance with the device calibration is acquired and the result of the software calibration is finely adjusted on the basis of the correction data. With this arrangement, particularly, the output characteristics according to the absolute density obtained by the software calibration can be maintained and the change in the relatively short time relative density in the print apparatuses can also be eliminated.

However, in the arrangement in which the software calibration is correlated with the device calibration, if image processing conditions for effecting the respective calibrations (for example, binarizing or multi-value obtaining) are different, the fine adjustment may not be performed with high accuracy. For example, in a case where a dither method is used as the binarizing, when the software calibration is performed, a dither pattern of dot concentration type attaching importance to gradation is set, and, on the other hand, when the device calibration is performed, in a case where the printer engine outputs a patch on the basis of patch data comprised of a dither pattern of dot dispersion type attaching importance to a resolving power, in the respective calibrations, gradation characteristics obtained from the patch patterns outputted with respect to the same gradation value data may be differentiated. In such a case, it cannot be said that the calibration data obtained by the software calibration is well matched to the correction data of the calibration data obtained by the device calibration, with the result that the calibration data accurately reflecting the output characteristics of the print apparatuses cannot be obtained.

As mentioned above, the fact that the set image processing conditions as is in the dither method are differentiated between the software calibration and the device calibration is given from the following arrangement. That is to say, there is an arrangement in which, in a printer driver of the host computer, the user can set a binarizing method as the image processing conditions in accordance with an image to be printed directly or indirectly (through selection of the kind of image to be printed). In such an arrangement, when the software calibration is effected, the patch is printed on the basis of the patch data based on the image processing conditions (binarizing method) set by the user, and, on the other hand, when the device calibration is effected, the patch is outputted on the basis of the image processing conditions previously set in the printer engine. As a result, the image processing conditions may be differentiated from each other.

SUMMARY OF THE INVENTION

An object of the present invention is to provide a calibration method which can solve the above-mentioned drawbacks.

Another object of the present invention is to provide a calibration method which permits high accurate calibration in which image processing conditions are matched to each other between software calibration and device calibration.

A further object of the present invention is to provide an image forming apparatus in which, when different halftone processes corresponding to the kinds of objects to be printed are performed, calibration may not be effected with respect to all of the halftone processes.

The other objects and features of the present invention will be apparent from the following detailed description of the invention referring to the accompanying drawings and the appended claims.

BRIEF DESCRIPTION OF THE DRAWINGS

FIG. 9 is a view showing a table representing correspondence between halftone patterns and calibration tables;

FIGS. 10A and 10B are views for explaining examples for setting a dither pattern;

FIGS. 13A, 13B, 13C and 13D are views for explaining adjustment of the calibration table;

FIG. 15 is a view showing an example of a display screen for the calibration.

DETAILED DESCRIPTION OF THE PREFERRED EMBODIMENTS

Figure 1:
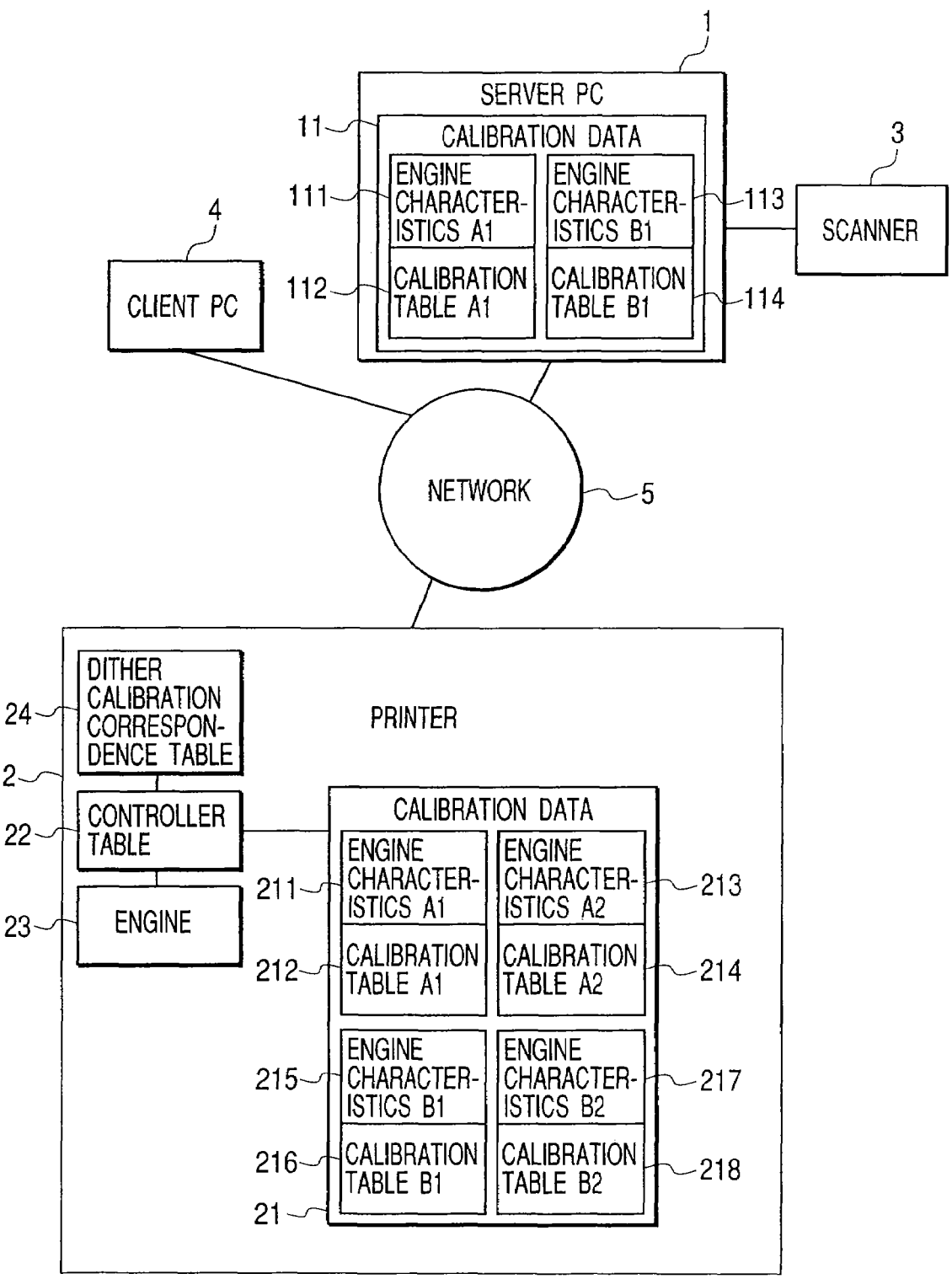
FIG. 1 is a block diagram showing a construction of a print system.

The present invention will now be fully explained in connection with embodiments thereof with reference to the accompanying drawings.

Incidentally, in an embodiment described hereinbelow, while an example that a color laser beam printer (LBP) is used as a printer apparatus constituting a system will be explained, it should be noted that the present invention can similarly be applied to print apparatuses such as other printers (for example, ink jet printer) and a copying machine. Further, while an example that four kinds of halftone patterns according to a dither method as image processing conditions are used will be explained, it is apparent that the present invention can be applied to many kinds of patterns, from the following explanation.

In an illustrated embodiment, regarding dither methods as binarizing or n-value (n>2) obtaining methods as the image processing conditions, four kinds of dither methods of dot concentration type are used, and software calibration is executed with association with device calibration, and, two calibration data in which similar patterns among four kinds of dither patterns are correctively gathered into two are acquired. That is to say, calibration data in which the dither methods used for outputting patches in the software calibration and in the device calibration become the same as or similar to each other is acquired for each of four kinds of dither patterns. In the following explanation, the two kinds of dither patterns discriminated from four kinds of dither patterns by approximation are referred to as "halftone pattern A" and "halftone pattern B", respectively.

In summary, in the calibration according to the illustrated embodiment, a first calibration table (calibration information, i.e., first gamma correction table) and first engine characteristics information of a printer which correspond to the halftone pattern A and the halftone pattern B are created (generated), and calibration table correction data corresponding to the respective halftone patterns are created on the basis of second engine characteristics information corresponding to the halftone patterns A, B obtained by effecting the device calibration executed by a printer controller of the printer and the first engine characteristics information corresponding to the halftone patterns A, B, and second calibration tables corresponding to the respective halftone patterns are created by using the calibration table correction data and the first calibration table. In an image processing using the second calibration tables corresponding to two kinds of halftone patterns A, B, one of two kinds of halftone patterns is selected in accordance with the halftone pattern presently set from among the four kinds of halftone patterns, and gamma correction is effected by using the selected halftone pattern. Then, printing is effected by sending data obtained after the image processing to a printer engine.

Now, a construction of the print system according to the illustrated embodiment and calibration based on such a construction will be explained concretely.

FIG. 1 is a block diagram showing the construction of the information processing system or print system according to the first embodiment of the present invention.

In FIG. 1, a server PC (personal computer) 1 as an information processing apparatus is connected to a network 5 and serves to execute various processing operations in the entire system including calibration which will be described later.

To this end, software for realizing such processing operations is installed in the server PC 1.

The server PC 1 includes a calibration data storing portion 11 provided within the server PC 1 and used for holding the following calibration data. That is to say, the reference numerals 111 and 112 denote first engine characteristics A1 and a first calibration table A1 which correspond to the halftone pattern A (among the two kinds of halftone patterns). On the other hand, the reference numerals 113 and 114 denote first engine characteristics B1 and a first calibration table B1 which correspond to the halftone pattern B. They are stored in the calibration data storing portion 11.

The system includes a plurality of printers 2 as print apparatuses (only one of which is shown in FIG. 1), which printers 2 are connected to the network 5 so that the printers can perform the printing by receiving data such as print data from a plurality of client PCs 4 (only one of which is shown in FIG. 1) similarly connected.

The printer 2 includes a calibration data storing portion 21 used for holding the following calibration data. That is to say, the reference numerals 211 and 212 denote first engine characteristics A1 and a first calibration table A1 which correspond to the halftone pattern A downloaded from the server PC 1, and the reference numerals 213 and 214 denote second engine characteristics A2 (latest engine characteristics) and a second calibration table A2 (latest calibration table) which correspond to the halftone pattern A acquired from the printer engine, as will be described later. They are stored in the calibration data storing portion 21.

Similarly, the calibration data storing portion 21 stores first engine characteristics (B1) 215 and a first calibration table (B1) 216 which correspond to the halftone pattern B downloaded from the server PC1 and second engine characteristics (B2) (latest engine characteristics) 217 and a second calibration table (B2) (latest calibration table) 218 which correspond to the halftone pattern B acquired from the printer engine, as will be described later.

Further, the printer includes a printer controller 22 which serves to effect print processing and various controls relating to the printer 2. The printer controller 22 also serves to store the first engine characteristics and first calibration tables corresponding to two kinds of halftone patterns A, B downloaded from the server PC 1 (as will be described later) into the calibration data storing portion 21 and to renew or update the second calibration tables corresponding to two kinds of halftone patterns stored in the calibration data storing portion 21.

Further, the reference numeral 24 denotes a dither calibration correspondence table for achieving correspondence between the halftone pattern and the calibration table, and, by using this correspondence table, the calibration table corresponding to the halftone pattern A or B can be selected in accordance with the halftone pattern presently set from among the four kinds of halftone patterns.

Further, the printer 2 includes a printer engine 23. Fundamentally, although the printer engine is a part for effecting the printing on the basis of the print data from the printer controller 22, as will be described later, the printer engine also serves to transmit engine characteristics information relating to output density of the printer engine 23 and to adjust maximum density in the engine characteristics.

A scanner 3 connected to the server PC 1 of the system is used for measuring patches outputted in the printer 2 when the calibration is effected and is also used as fundamental application for inputting an original. Further, the client PC 4 as the information processing apparatus is connected to the network 5 to perform creation and edition of desired print data and to emit print instruction to the printer 2.

In the calibration according to the illustrated embodiment effected in the print system or information processing system, as mentioned above, the software calibration is effected in the server PC 1, and the created calibration table (calibration information) for gamma correction is downloaded to the printer 2, and the printer 2 performs the gamma correction by fundamentally using this table to create the print data. In the printer 2, the device calibration is automatically performed at a predetermined individual timing to create correction data for the downloaded calibration table, thereby effecting fine adjustment of the calibration table. Further, in the calibration in which the software calibration is correlated with the device calibration, regarding the halftone pattern A and the halftone pattern B which are dither methods for binarizing processing used in the system, the calibration tables and correction data are created. Further, in the image processing in the printer, the four kinds of halftone patterns are used, and the corresponding table is selected to correspond to the halftone pattern A or B.

Now the software calibration using the server PC 1, download of the created calibration data to the printer 2, and the image processing using the calibration tables in the printer 2 will be explained with reference to FIGS. 2 to 8.

Figure 2:
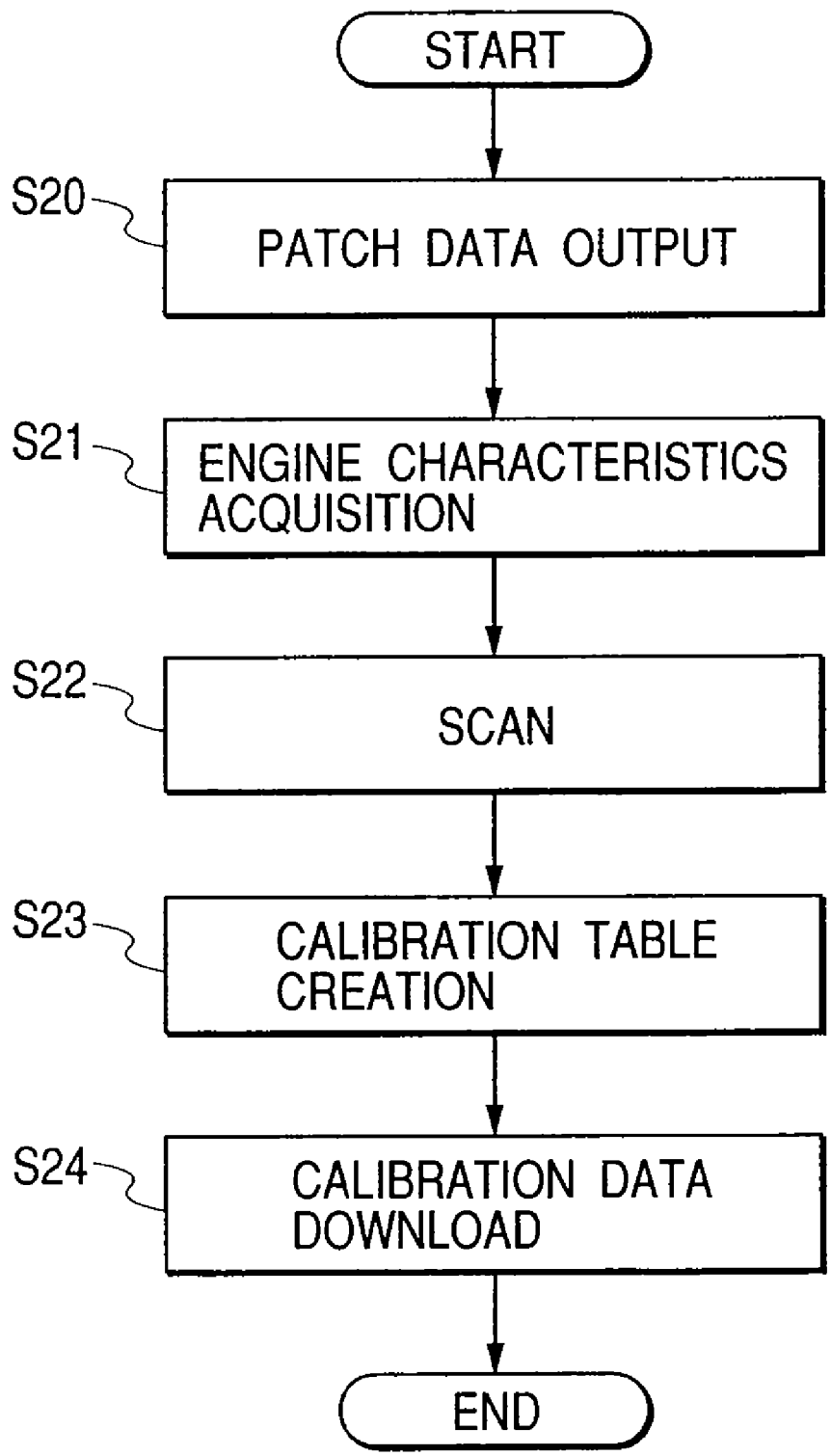
FIG. 2 is a flow chart showing a processing procedure of software calibration.

FIG. 2 is a flow chart showing processing procedures for the software calibration using the server PC 1 and download of data. Incidentally, after the software calibration is once executed, since the software calibration is adjusted by the device calibration in the printer 2, the software calibration may be performed only once fundamentally. However, the user may instruct execution of the software calibration at a desired timing. For example, if deterioration of gradation cannot be corrected only by the adjustment based on the device calibration, such instruction can be used.

In FIG. 2, first of all, in a step S20, the server PC 1 outputs patch data to the printer 2 to instruct the printing of the patches. In accordance with this, the printer 2 performs the printing of the patches.

Figure 3:
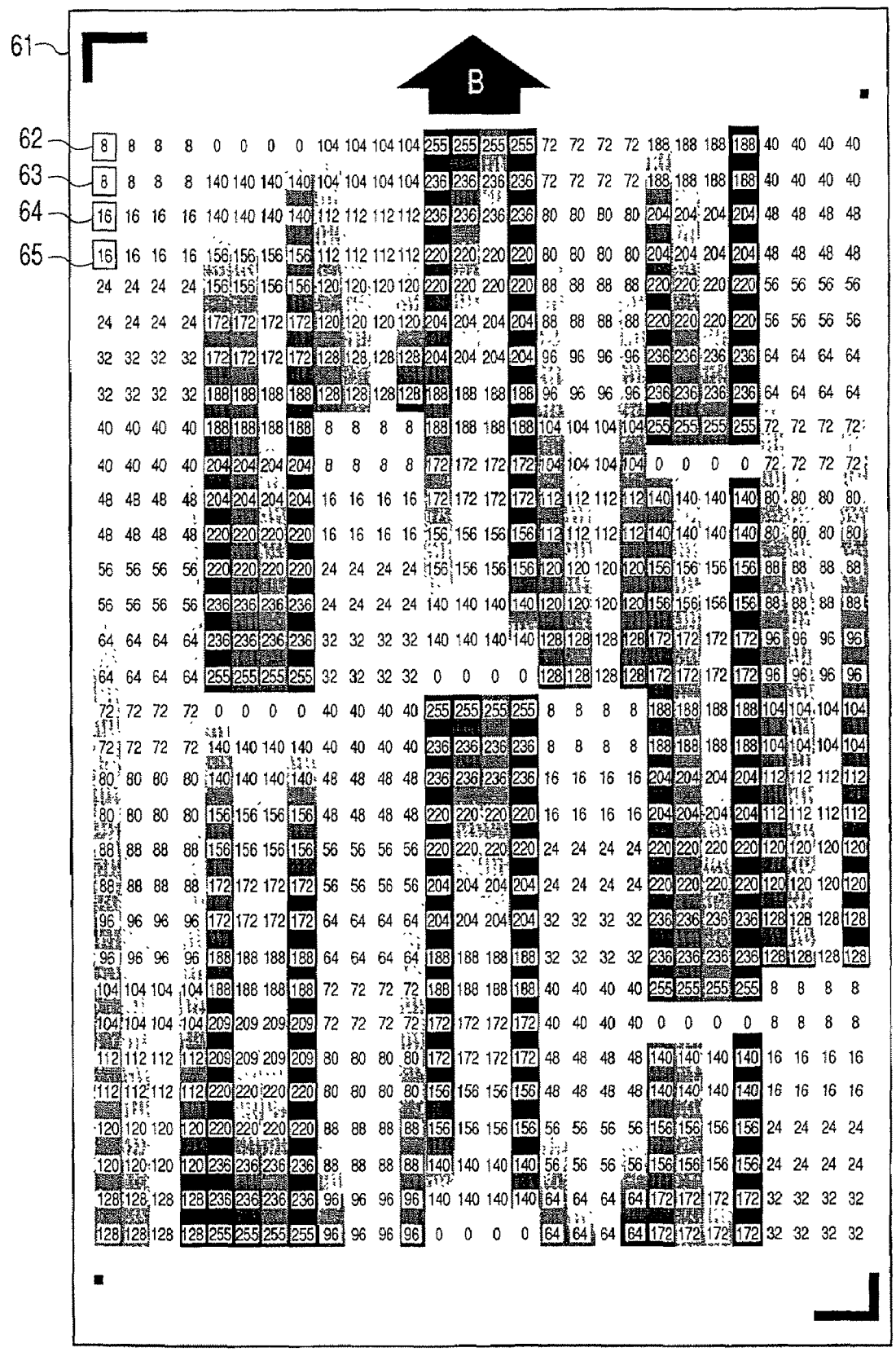
FIG. 3 is a view showing patch data outputted in the software calibration.

FIG. 3 is a view showing a recorded sheet on which the patch data is printed. In FIG. 3, the reference numeral 61 denotes the entire patch data; and 62 denotes one block constituting the patch data, i.e., denotes data corresponding to one patch. The numerical value in each block represents a data value of the patch, i.e., a gradation value. The patch data is constituted by 896 (32 (columns)×28 (rows)) blocks. In the row direction, the blocks are repeated in order of cyan (C), magenta (M), yellow (Y) and black (K) as toner colors for printing. On the other hand, in the column direction, the cyan, magenta, yellow and black blocks in which the gradation values are increased by 8 or 16 are arranged. More specifically, in the patch data shown in FIG. 3, four patch data as highlight portions in which the gradation values are increased from 8 to 128 by 8 and six patch data as shadow portions in which the gradation values are increased from 140 to 255 by 16 are arranged.

The patch data shown in FIG. 3 include patch data associated with two kinds of halftone patterns. That is to say, in the column direction, the patch data associated with the halftone pattern A and the patch data associated with the halftone pattern B are arranged alternately. When these patches are printed, binarizing processes based on the halftone pattern A and the halftone pattern B are effected, respectively. More specifically, for example, blocks 62 and 64 are associated with the halftone pattern A and blocks 63 and 65 are associated with the halftone pattern B, and, among the patch data having the same gradation value in the column direction, the upper blocks are data for which the binarizing is effected by the halftone pattern A and the lower blocks are data for which the binarizing is effected by the halftone pattern B. Incidentally, in the gradation values of 0 and the gradation values of 255, since the same result can be obtained by the binarizing based on these halftone patterns, only one block is arranged.

Incidentally, difference in number between the highlight portion blocks and the shadow portion blocks in the patch data is given for the reason that more minute gradation information for the highlight portions is required in comparison with the shadow portions in this system. Further, difference in number between the highlight portions and the shadow portions is given for the reason that dispersion in input values of the shadow portions in the scanner tends to become greater in comparison with the highlight portions.

Further, although the patch data are transferred from the server PC 1 to the printer 2 and the print output is effected from the printer 2 on the basis of the patch data, the printer 2 may store the patch data themselves having the above-mentioned format or information constituting such data and the patches may be printed on the basis of the stored patch data or the patch data constituted by such information in accordance with the print instruction from the server PC 1. Alternatively, the patch data may be created by sending the information constituting the patch data from the server PC 1 to the printer 2. Incidentally, the patch data constituting information relies upon a command system included in the printer 2, but, detailed explanation will be omitted here.

Figure 11:
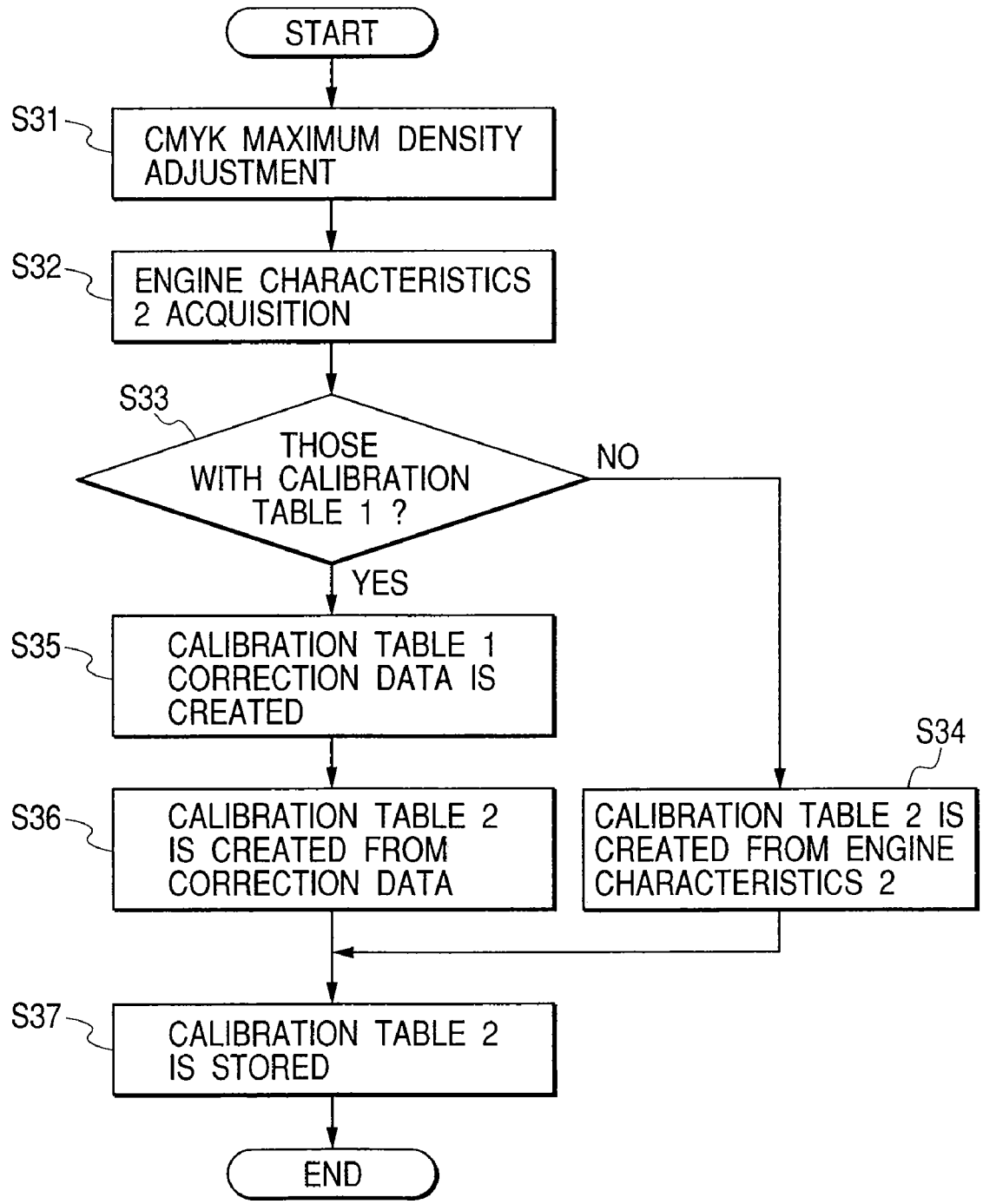
FIG. 11 is a flow chart showing a processing procedure of device calibration.

Then, in a step S21, as the printer engine characteristics when the patches are printed, engine characteristics information is acquired from the printer 2. The acquisition of the engine characteristics is effected by acquiring the engine characteristics 211, 215 (as the latest engine characteristics) corresponding to the halftone patterns A, B stored in the calibration data storing portion 21 of the printer 2. The second engine characteristics 211, 215 stored in the calibration data storing portion 21 may be acquired by executing the device calibration as shown in FIG. 11 immediately after the patches are printed in the step S20 or may be latest engine characteristics acquired by the device calibration effected at last. Incidentally, explanation of a command system regarding acquisition of data based on the server PC 1 will be omitted here.

In the step S21, the server PC 1 further stores the second engine characteristics corresponding to the halftone patterns A, B acquired as mentioned above into the calibration data storing portion 11 as the first engine characteristics 111, 113. These first engine characteristics 111, 113 are correlated with first calibration tables (sought as described below) as the engine characteristics when the patches are printed. Incidentally, the detailed procedure for seeking the engine characteristics will be described later with reference to FIG. 11.

Then, in a step S22, the printed patches are read by using the scanner 3. That is to say, when the user sets the sheet on which the patch patterns were printed onto the scanner 3 and performs a predetermined operation, the scanner 3 measures densities of the patches corresponding to the blocks of the patch data, and measured results are outputted to the server PC 1 as R (red), G (green), B (blue) signals. In the server PC 1, regarding the halftone patterns A and B, on the basis of the arrangement of the block of the patch data, average of four highlight portions and average of six shadow portions are calculated from the inputted values, with the result that R, G and B signals regarding 24 gradation values are obtained for each of C, M, Y and K colors. Then, by using a brightness density conversion table representing correspondence between R, G and B brightness signals of the scanner 3 and C, M, Y and K density signals of the printer 2, 24 density characteristics values are obtained from 24 brightness signals for each of the halftone patterns A and B. Incidentally, although not fully described here, the scanning operation of the scanner 3 is performed via a scanner driver installed in the server PC 1, and setting of a scan resolving power and designation of input area are effected via the scanner driver.

Then, in a step S23, the calibration table is created.

Figure 4A:
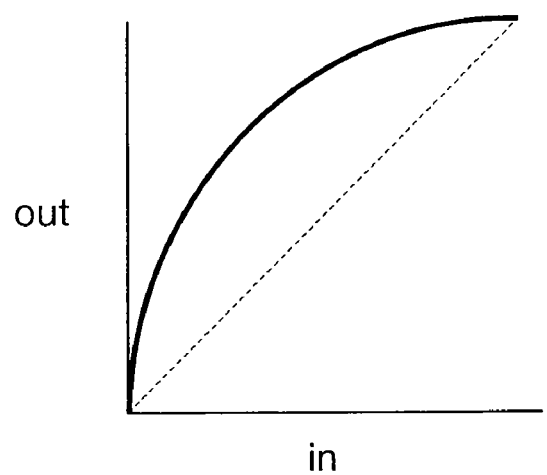
FIGS. 4A, 4B and 4C are views for explaining a process for creating a calibration table.
Figure 4B:
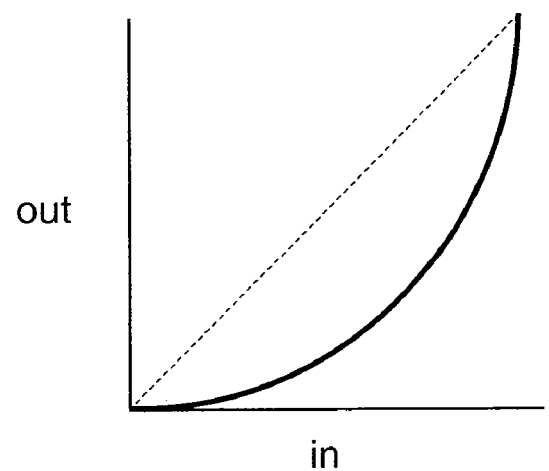
Figure 4C:
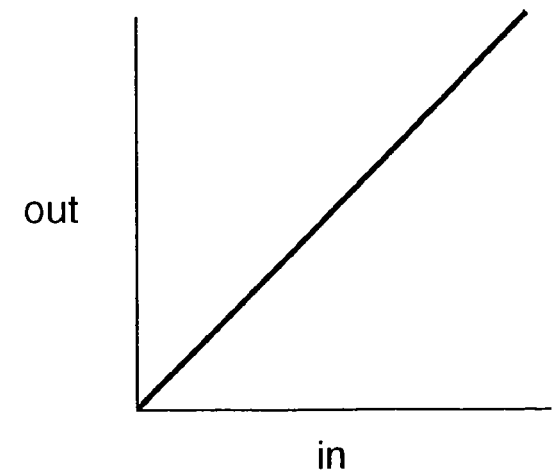

FIGS. 4A to 4C are views for explaining the principle for creating the calibration table. FIG. 4A is a graph showing output density characteristics of the printer 2 upon each printing, in which gradation values of the patch data shown in FIG. 3 are indicated as input (in) and 24 density values obtained by the scanner are indicated as output (out). Incidentally, in the explanation using FIGS. 4A to 4C, for simplicity's sake, although only one color is illustrated and described, it should be noted that similar processes are effected for four C, M, Y and K colors. Further, in FIG. 4A, it is well-known that a relationship between the input and the output is sought by interpolating calculation on the basis of the above-mentioned 24 values.

A calibration table is created to obtain ideal linear output density characteristics as shown in FIG. 4C with respect to the characteristics shown in FIG. 4A. To this end, in order to approximate the present output density characteristics (FIG. 4A) to the ideal output density characteristics (FIG. 4C), a calibration table having a relationship shown in FIG. 4B which is a reversed function of the relationship shown in FIG. 4A is sought. That is to say, when the printer 2 has the output density characteristics (FIG. 4A), by effecting gamma correction by using the calibration table having the characteristics shown in FIG. 4B (more specifically, gamma correction table), characteristics in which the gradation values of the input density data becomes the gradation values of the print output as they are, as shown in FIG. 4C, can be obtained.

Incidentally, as the above-mentioned calibration tables, two tables regarding halftone pattern of the dither method are created, and relationship between the halftone patterns and the output density characteristics will be explained with reference to FIGS. 5A to 5D and FIGS. 6A to 6D.

Figure 5A:
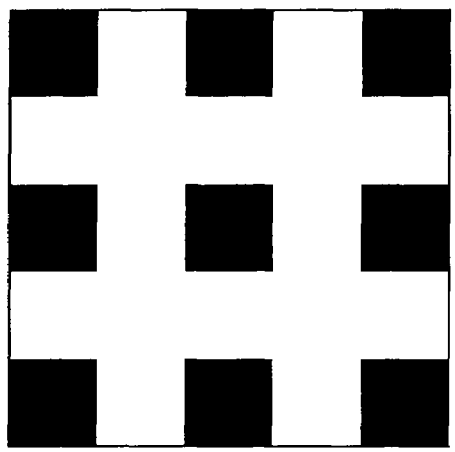
FIGS. 5A, 5B, 5C and 5D are views showing a relationship between kinds of halftone patterns and output density characteristics.
Figure 5B:
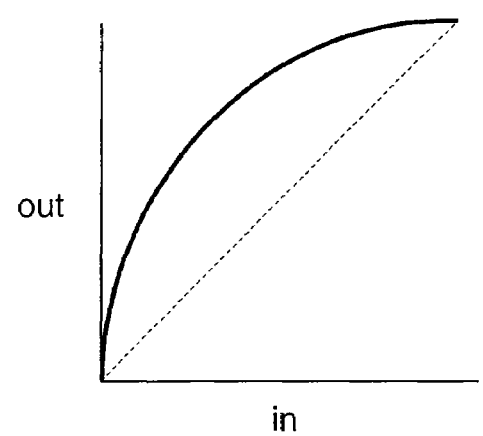
Figure 5C:
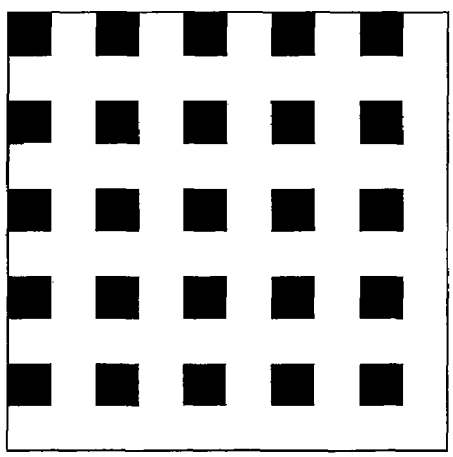

FIGS. 5A and 5C are views showing patch dot patterns printed out on the basis of data (having gradation values of 128) binarized by the respective dither methods. Among them, FIG. 5A shows an example of the halftone pattern A as the dither method of dot concentration type attaching importance to gradation. In case of such a pattern, since the gradation is generally high, this pattern is used in photo-image and/or gradation in many cases. FIG. 5B shows an example of output density characteristics obtained by measuring the patches of the halftone pattern A.

Figure 5D:
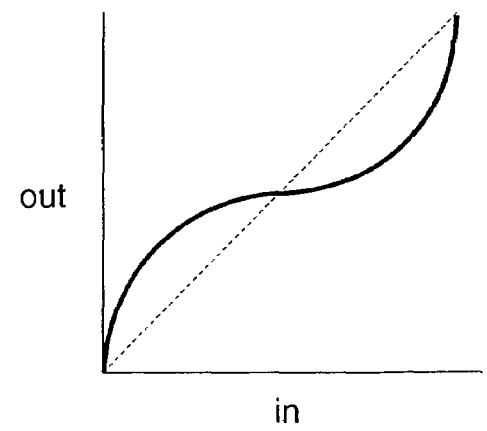

On the other hand, FIG. 5C shows an example of the halftone pattern B as the dither method of dot dispersion type attaching importance of a resolving power. In case of such a pattern, since the resolving power is generally high, this pattern is used in fine lines and/or characters in many cases. FIG. 5D shows an example of output density characteristics of the halftone pattern B.

Figure 6A:
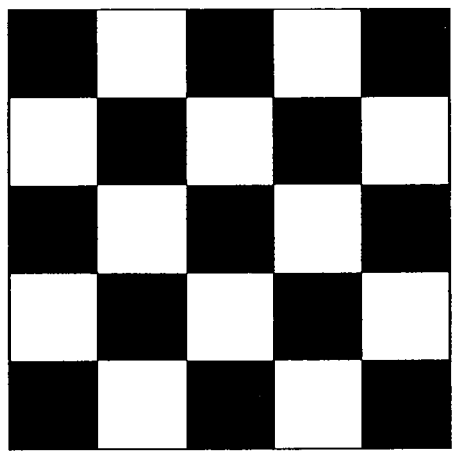
FIGS. 6A, 6B, 6C and 6D are views showing a relationship between kinds of halftone patterns and output density characteristics.
Figure 6B:
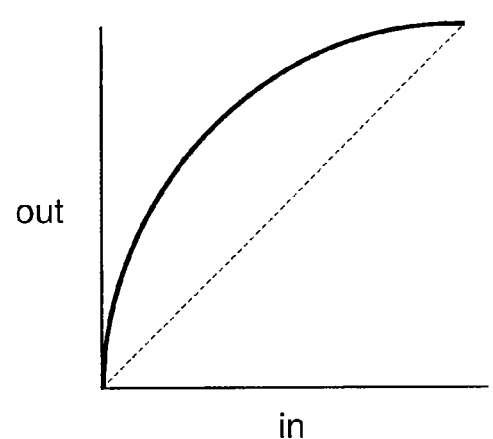
Figure 6C:
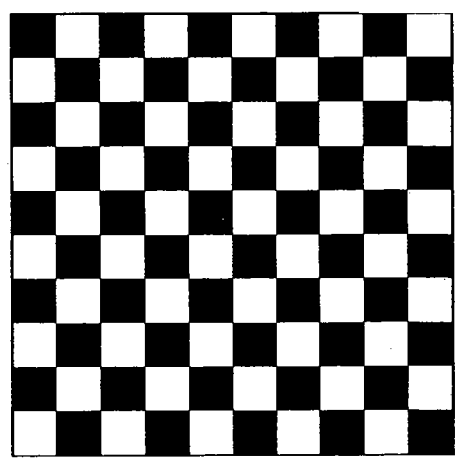
Figure 6D:
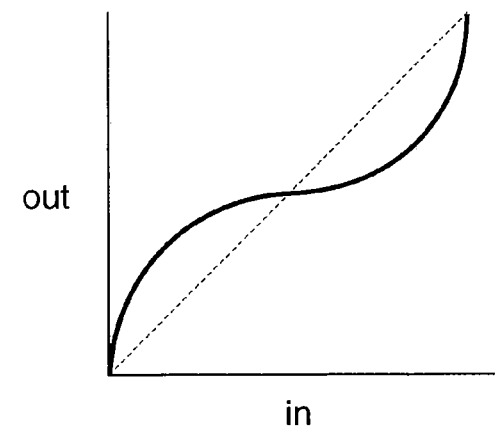

On the other hand, FIG. 6A shows a halftone pattern C approximated to the halftone pattern shown in FIG. 5A. Thus, as shown in FIG. 6B, the output density characteristics are also approximated to those of the halftone pattern A shown in FIG. 5B. On the other hand, FIG. 6C shows an example of a halftone pattern D approximated to the halftone pattern B shown in FIG. 5C. In this case, as shown in FIG. 6D, the output density characteristics are also approximated to those of the halftone pattern B.

As shown in these Figures, since the output density characteristics obtained from the patches are varied with the difference of the halftone patterns as image processing conditions, it is desirable that the calibrations are carried out in accordance with the respective image processing conditions. In the process for creating the calibration table, in accordance with the output density characteristics (FIG. 5B, FIG. 5D) obtained regarding the halftone patterns A and B, the reversal functions as explained in connection with FIG. 4B are created as calibration tables.

Regarding calibration tables corresponding to other halftone patterns C and D, calibration tables corresponding to approximated halftone patterns are selected and used, as will be described in connection with FIG. 8.

In the step S23, when the calibration tables are created, the created calibration tables corresponding to the respective halftone patterns are stored in the calibration data storing portion 11 as first calibration tables 112, 114.

Then, in a step S24, the first engine characteristics 111 and the first calibration table 112 corresponding to the halftone pattern A and the first engine characteristics 113 and the first calibration table 114 corresponding to the halftone pattern B stored in the calibration data storing portion 11 are downloaded to the printer 2. Incidentally, in this case, although download command depends upon the command system of the printer 2, detailed explanation thereof will be omitted here. The downloaded the first engine characteristics 111 and first calibration table 112 corresponding to the halftone pattern A and first engine characteristics 113 and first calibration table 114 corresponding to the halftone pattern B are stored in the calibration data storing portion 21 via the printer controller 22, as first engine characteristics 211 and first calibration table 212 corresponding to the halftone pattern A and first engine characteristics 215 and first calibration table 216 corresponding to the halftone pattern B.

Figure 7:
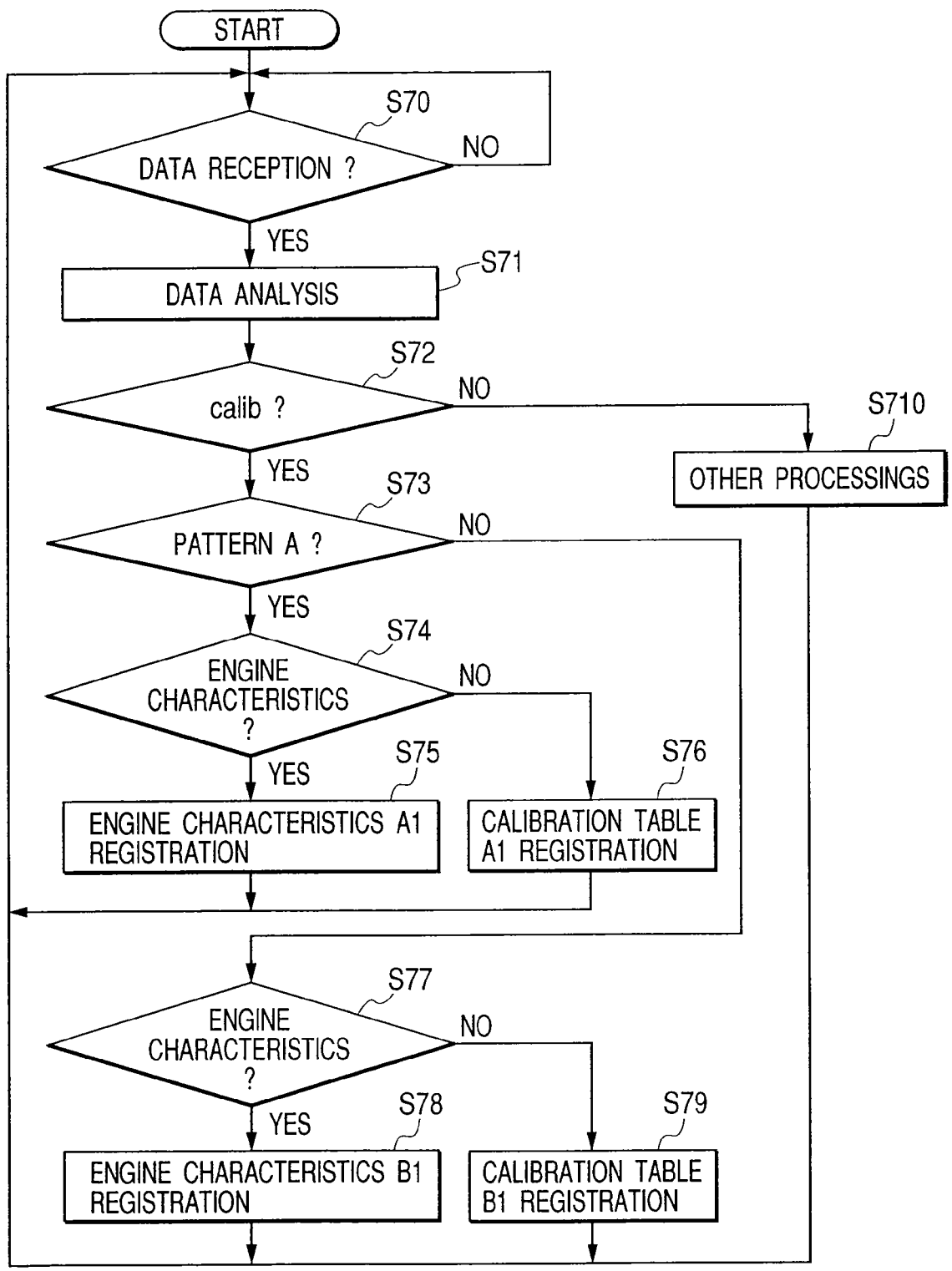
FIG. 7 is a flow chart showing a process of calibration data received from a server PC.

FIG. 7 is a flow chart showing a processing procedure of the printer controller 22 when the printer 2 receives the download data from the server PC 1 or the client PC 4. The processing includes not only download of the calibration data but also receiving of various download data such as print data.

First of all, in a step S70, data reception is waited. If it is judged that the data reception is effected, in a step S71, the received data is analyzed. Judgement of an analyzed result is effected in a step S72. If it is judged that the result is calibration download command, in a step S73, it is judged whether the data corresponds to the halftone pattern A or not. If the data is associated with the halftone pattern A, in a step S74, it is judged whether the data is engine characteristics or not. If the data is the engine characteristics, in a step S75, as mentioned above, engine characteristics A1 are registered in the calibration data storing portion 21 as the first engine characteristics 211 corresponding to the halftone pattern A. In the step S74, if it is judged that the data is not the engine characteristics, it is judged that the data is the calibration table, and, in a step S76, as mentioned above, a calibration table A1 is registered in the calibration data storing portion 21 as the first calibration table 212 corresponding to the halftone pattern A.

In the step S73, if it is judged that the data does not correspond to the halftone pattern A, it is judged that the data corresponds to the halftone pattern B, and, in a step S77, it is judged whether the data is engine characteristics or not. If it is judged that the data is the engine characteristics, in a step S78, as mentioned above, engine characteristics B1 are registered in the calibration data storing portion 21 as the first engine characteristics 215 corresponding to the halftone pattern B. In the step S77, if it is judged that the data is not the engine characteristics, it is judged that the data is the calibration table, and, in a step S79, as mentioned above, a calibration table B1 is registered in the calibration data storing portion 21 as the first calibration table 216 corresponding to the halftone pattern B.

In the step S72, it is judged that the data is not the calibration download command, in a step S710, processing procedures corresponding to the respective commands are effected.

In the illustrated system, the print data is transferred from application on the client PC 4 or the server PC 1 to the printer 2 via the printer driver. On the other hand, the printer controller 22 of the printer 2 serves to effect analysis of the print data in the step S710 of FIG. 7, construction of page layout, image processing, printing and the like.

Figure 8:
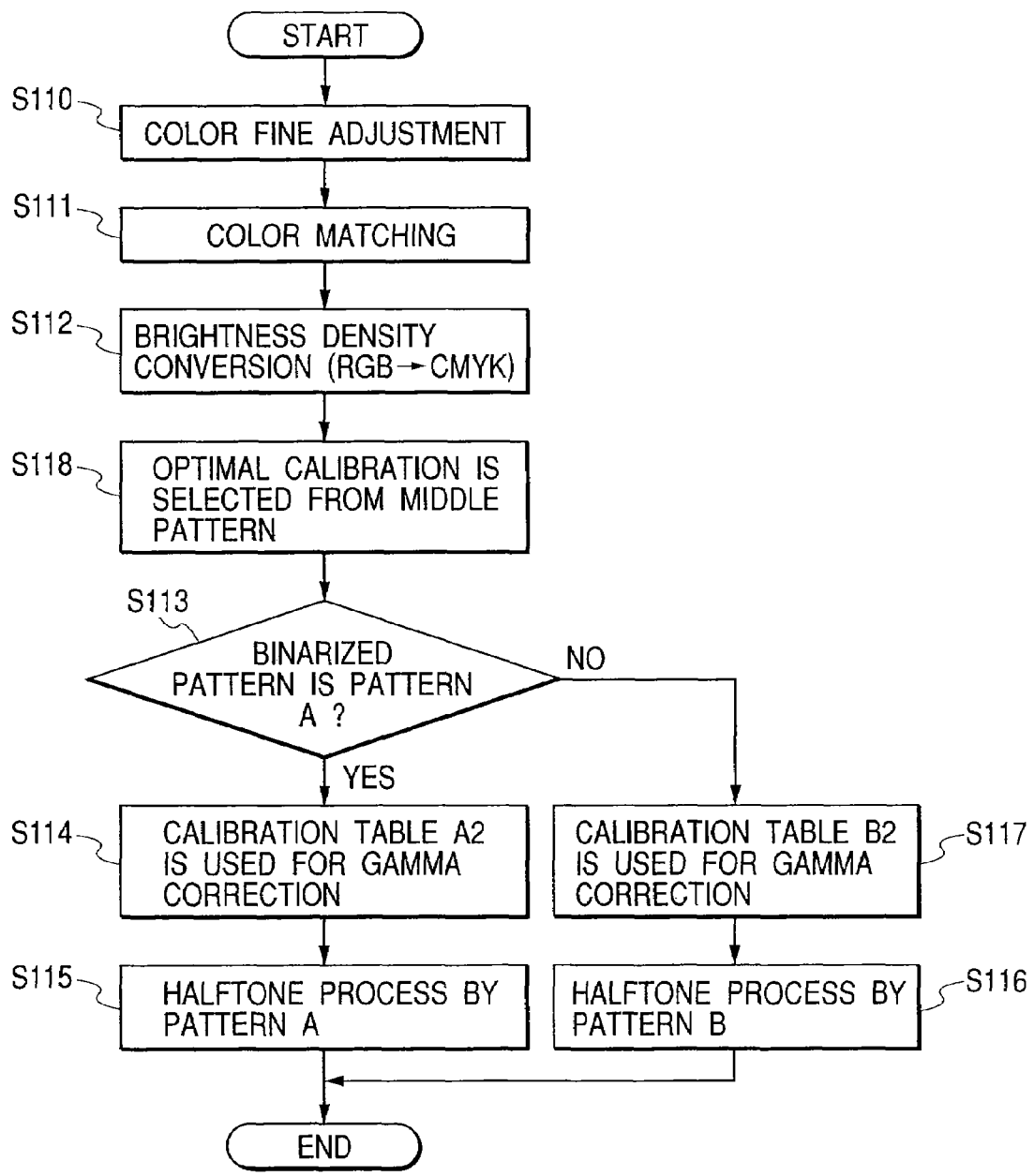
FIG. 8 is a flow chart showing image processing using the calibration table.

FIG. 8 is a flow chart showing an image processing procedure of the printer controller 22 effected by using the latest calibration tables in which the downloaded calibration tables are adjusted as will be described in connection with FIG. 11.

First of all, in a step S110, color fine adjustment of image signals R, G and B as the print data sent from the client PC 4 as the host apparatus is performed.

The color fine adjustment includes brightness correction and contrast correction. Then, in a step S111, color matching processing is effected. The color matching processing is processing for matching the coloring of a monitor of the host apparatus with the coloring of the print of the printer 2. Then, in a step S112, brightness density conversion processing is effected. This processing is processing for converting the brightness signals R, G and B into density signals C, M, Y and K as print signals of the printer.

Then, in a step S118, the optimal calibration table is selected on the basis of the halftone pattern presently set. This selection processing is effected by using a table for making correspondence between the halftone pattern and the calibration table settable in the system.

FIG. 9 is a view schematically showing contents of the dither calibration correspondence table 24 (FIG. 1) in which the halftone patterns are correlated with latest calibration tables.

The contents of the table are determined in accordance with approximation of the output density characteristics explained in connection with FIGS. 5A to 5D and FIGS. 6A to 6D.

That is to say, although the halftone pattern A shown in FIG. 5A differs from the halftone pattern C shown in FIG. 6A, as shown in FIGS. 5B and 6B, the respective output density characteristics are approximated to each other. The halftone pattern C having the output density characteristics similar to those of the halftone pattern A in this way is correlated with a calibration table based on the halftone pattern A, as shown in FIG. 9.

Similarly, although the halftone pattern B shown in FIG. 5C differs from the halftone pattern D shown in FIG. 6C, as shown in FIGS. 5D and 6D, the respective output density characteristics are approximated to each other. Thus, the halftone pattern D is correlated with a calibration table based on the halftone pattern B, as shown in FIG. 9.

Now, an example for creating the dither calibration correspondence table 24 will be described. A plurality of gradation patches which were processed by using the calibration tables A and B with respect to the halftone patterns C and D are printed out. Colors of the printed patches are measured. A calibration table in which a result is more linear is correlated with the halftone pattern.

In order to prevent reduction in calibration accuracy due to the fact that the halftone patterns used between the software calibration and the device calibration are differentiated, it is fundamentally desirable that the software calibration and the device calibration are effected for each of the halftone patterns used in the system thereby to obtain the calibration tables. However, in the illustrated embodiment, as mentioned above, the above-mentioned calibrations are not effected for all of four kinds of halftone patterns, but, the calibrations are effected for fewer two halftone patterns A and B and other halftone patterns C and D are correlated with the obtained tables A and B. As a result, reduction in performance of the system required for creating the calibration tables can be prevented and increase in storing area required for storing the calibration tables can be reduced.

Incidentally, in the above example, while a method in which the optimal calibration table is selected from the halftone patterns by using the dither calibration correspondence table was explained, tabling may not be effected and processing for judging which calibration table be used for each halftone pattern may be effected by using condition division.

Next, processing for setting the halftone pattern will be explained with reference to FIGS. 10A and 10B.

As shown in FIG. 10A, this processing is performed by using a setting screen of the printer driver installed in the client PC 4 or the server PC 1. That is to say, in a screen for setting a color half tone, the user can select either (halftone) pattern A, pattern B, pattern C or pattern D by manipulating a pull-down menu. FIG. 10B shows another example of a setting screen for color half tone, in which the halftone pattern used for each object constituting a page such as image, graphics or text can be selected.

In FIG. 8, after the calibration table is selected in the step S118, in a step S113, a halftone pattern corresponding to the selected calibration table is judged. When the calibration table A is selected on the basis of the table correspondence in the step S118 and if it is judged that the halftone pattern A is correlated with such a table, in a step S114, gamma correction is effected by using a calibration table A(2) associated with the judged halftone pattern A. That is to say, the gamma correction is effected by using C, M, Y and K 8-bit multi-value signals obtained by the brightness density conversion in the step S112 as input/output signals and by using the second calibration table 214 (latest calibration table) corresponding to the halftone pattern A, thereby converting input/output characteristics represented by the multi-value signals into linearity. Then, in a step S115, the C, M, Y and K 8-bit signals are converted into binary signals matched to the output system by using the dither method associated with the halftone pattern A. Incidentally, in the illustrated embodiment, while the binarizing processing for converting into C, M, Y and K 1-bit signals was explained, four-value processing or eight-value processing may be effected in dependence upon a laser used.

On the other hand, in the step S113, if it is judged that the calibration table B corresponding to the halftone pattern B is selected, in a step S116, the gamma correction is effected by using the second calibration table 218 (latest calibration table) corresponding to the halftone pattern B. Then, in a step S117, the binarizing processing is effected by using the halftone pattern B.

By using the above-mentioned software calibration, difference in output density characteristics between the apparatuses can be eliminated, thereby stabilizing the absolute density. However, the engine characteristics of the printer is changed relatively easily, for example, if a temperature of the drum is increased during the continuous printing or if an environment temperature is changed. To cope with this, the contents of the calibration table can be adjusted by effecting the device calibration individually in the printer 2 and by correcting the calibration table obtained by the software calibration on the basis of correction data obtained by such device calibration. As a result, the user does not require to effect the software calibration frequently, thereby reducing the user's burden. By effecting the software calibration and the device calibration (described later) for each of the plural halftone patterns, the accuracy of the calibration can be enhanced.

Next, a procedure for effecting the device calibration according to the illustrated embodiment to acquire latest calibration table will be explained mainly with reference to FIG. 11.

FIG. 11 is a flow chart mainly showing a processing procedure of the device calibration in the printer 2.

The device calibration is started or triggered by an event in which the engine characteristics tend to be changed (for example, upon change in temperature/humidity detected by a temperature/humidity sensor (not shown) provided in the printer engine 23, upon change in temperature of the drum, upon printing of many sheets, or upon exchange of the drum or a toner cartridge).

Although other events constituting the trigger can be considered, details thereof will not be referred to here.

In this processing, first of all, in a step S31, the maximum densities of C, M, Y and K colors in the printer engine 23 are adjusted. Normally, in design of the printer engine, although target maximum densities are determined, such densities are changed during a long term. In this step, for example, regarding the respective colors, patches having maximum density data and other several gradation value data (patches other than those having maximum density data are used in processing in a next step S32) are formed on the photosensitive drum, and these patches are developed with the respective colors, and maximum density values of C, M, Y and K colors are obtained by measuring the developed patches by sensors. If the maximum value is changed from the target value, adjustment for obtaining optimal maximum density is effected by controlling developing bias and the like. Incidentally, similar to FIG. 3, the patches are formed with respect to both halftone pattern A and halftone pattern B.

Figure 12:
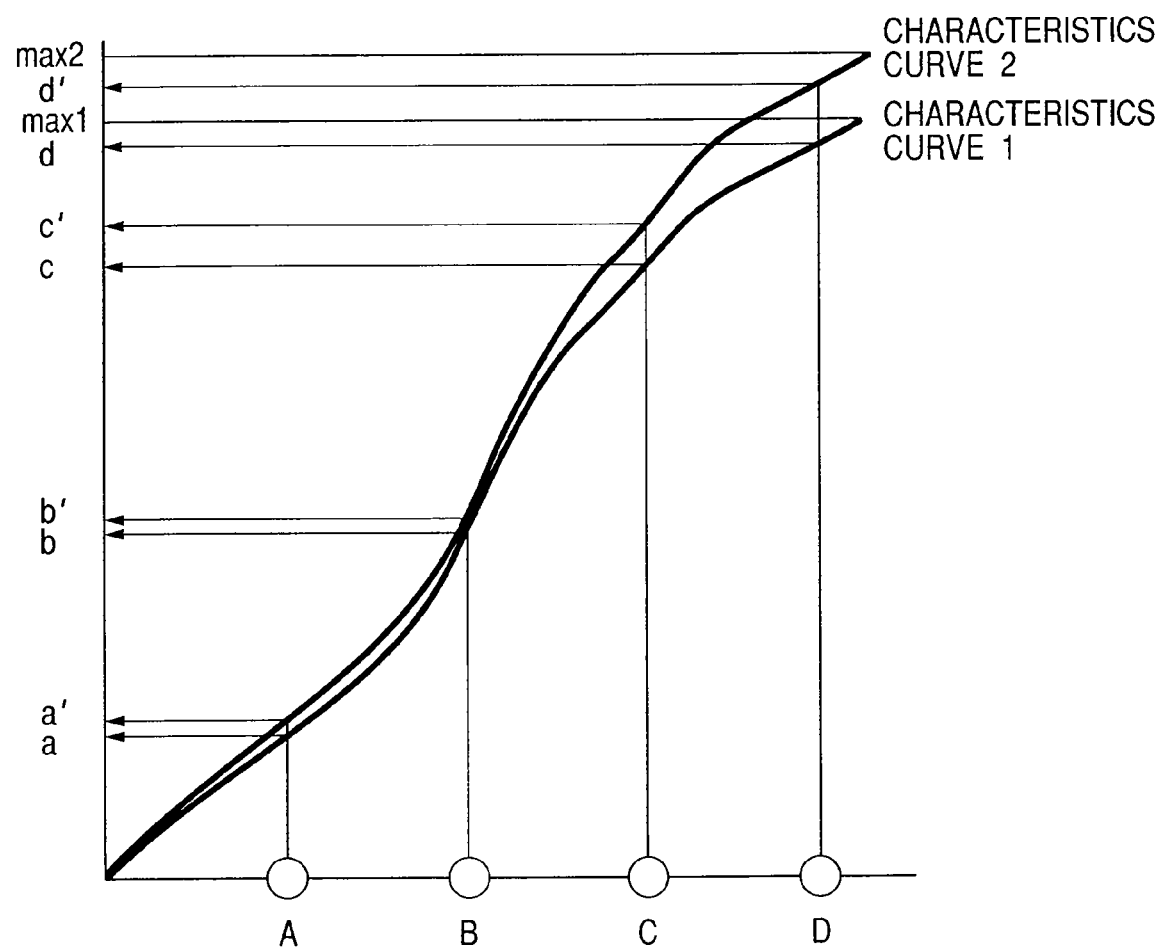
FIG. 12 is a view showing output density characteristics for explaining adjustment of output density characteristics of a printer engine on the basis of the device calibration.

FIG. 12 is a view showing output density characteristics in this case. Now, the maximum density adjustment will be fully explained with reference to FIG. 12. A characteristics curve 2 shown in FIG. 12 shows an example of a density characteristics curve before maximum density adjustment, and a characteristics curve 1 shows an example of a density characteristics curve after the maximum density adjustment. The maximum density in the characteristics curve 2 is represented by "max2". In the maximum density adjustment processing in the step S31, the fact that the maximum density value at that time is max2 is detected by a patch sensor. To the contrary, since the target value of the maximum density is max1, the printer engine 23 controls the developing bias value to effect adjustment so that the maximum density becomes max1.

After the maximum density adjustment, in the step S32, engine characteristics 2 as latest engine characteristics are acquired. This processing is effected by sending several halftone density sensor values from the printer engine 23 to the printer controller 22 in response to demand from the printer controller 22. That is to say, densities of the plural patches other than those having the maximum density values and formed on the drum upon maximum density adjustment are measured by the sensors, and the measured values are sent to the printer controller 22. The measured values are stored in the calibration data storing portion 21 as engine characteristics A2 (or B2) (latest engine characteristics 2).

Such a situation will be explained with reference to FIG. 12. Incidentally, in FIG. 12, to simplify the explanation, although four intermediate input gradation values and sensor measured values corresponding thereto are shown, it should be noted that the number is not limited to four. Further, while one halftone pattern, for example, halftone pattern A will be explained, the halftone pattern B can be handled similarly.

In FIG. 12, point A, B, C and D on the abscissa indicate predetermined input gradation values, and points a, b, c and d on the ordinate indicate density values obtained by measuring the patches formed in correspondence to the input gradation values by the sensors. The printer engine 23 transfers four measured values (a, b, c, d) to the printer controller 22.

Incidentally, the sensor measured values before the maximum density adjustment are indicated by a', b', c' and d' and these values are changed to a, b, c and d by the maximum density adjustment. Namely, since the sensor measured values, i.e., engine characteristics are greatly influenced by the maximum density adjustment, it is required that the processing operations be effected in order of maximum density adjustment and acquisition of engine characteristics as a continuous flow.

In general, sensors for measuring the densities of the developed patches do not have accuracy for surely obtaining the absolute density values since there is dispersion in characteristics between the sensors. However, when the same sensor is used, even if characteristics of the developing system are changed, measured values responding to such change can be obtained. That is to say, although the absolute accuracy is low, accuracy for detecting the relative change can be expected.

Then, in a step S33, it is judged whether the calibration tables 1 (A1 and B1) are downloaded in the calibration data storing portion 21. If the calibration tables 1 are not downloaded, in a step S34, the calibration tables 2 (A2 and B2) are created in the same manner as the conventional device calibration. That is to say, in this case, the software calibration explained in connection with FIG. 2 is not yet performed, and, in this case, the calibration tables are created by using the sensor measured values and these table are used in the later print processing.

Explaining this processing with reference to the characteristics curve 1 shown in FIG. 12, first of all, the calibration tables 2 can be created by obtaining the characteristics curve 1 from the sensor measured values a, b, c and d (engine characteristics) by approximation formulae and by seeking a reversal function for acquiring target characteristics as shown in FIGS. 4A to 4C.

On the other hand, in the step S33, if it is judged that the calibration tables 1 are downloaded, in a step S35, the calibration table correction data corresponding to the halftone patterns are created.

The creation of the correction data is effected as follows. Here, while the halftone pattern A will be explained, the other halftone pattern B are handled similarly. First of all, a characteristics curve such as the characteristics curve 1 shown in FIG. 12 is obtained from the latest engine characteristics (second engine characteristics data 213 in the calibration data storing portion 21) acquired in the step S32 by approximation formulae. Then, similarly, a characteristics curve is obtained from the first engine characteristics 211 (engine characteristics upon execution of the software calibration) from approximation formulae. Provisional calibration tables are acquired by seeking reversal function curves for obtaining the linearity shown in FIG. 4C for respective engine characteristics. The calibration correction data is created by determining difference between these two provisional calibration tables. The correction data is information for representing characteristics changes regarding the engine, sensor level and the like.

Then, in a step S36, the calibration tables 2 (A2 and B2) corresponding to the halftone patterns and stored in the calibration data storing portion 21 are updated or renewed. This processing is effected by using merge between the calibration table correction data created in the step S35 and the calibration tables 1 (A1 and B1) stored in the calibration data storing portion 21. That is to say, the calibration tables 1 are downloaded by the execution of the software calibration in the server PC 1 and the contents thereof are adjusted by the merge of the correction data.

In a next step S37, in accordance with the halftone patterns, the updated calibration tables 2 are stored in the calibration data storing portion 21.

FIGS. 13A to 13D are views for explaining a series of such processing operations. Here, while one of the halftone patterns will be explained, the other halftone pattern can be handled similarly. FIG. 13A shows the first calibration table 1 created by the software calibration and downloaded and stored in the calibration data storing portion 21 of the printer 2. As shown in FIG. 13B, the maximum density adjustment of C, M, Y and K colors in the printer engine 23 is effected, thereby acquiring the engine characteristics 2. Then, as shown in FIG. 13C, the calibration correction data which is the difference between the engine characteristics 2 and the engine characteristics 1 upon software calibration is created. Further, merge between the correction data and the calibration table 1 is effected. The created latest calibration table 2 is stored in the calibration data storing portion 21 as the second calibration table 214.

In this way, the printer controller 22 of the printer 2 can perform the image processing shown in FIG. 8 by using the second calibration table as the latest calibration table corresponding to the halftone pattern stored in the calibration data storing portion 21.

Incidentally, although the device calibration as mentioned above is automatically effected in the printer, the device calibration can similarly be effected in other printers of print type, as well as the electrophotographic type according to the illustrated embodiment. For example, in case of a printer of ink jet type, an optical sensor may be provided on a carriage for effecting scanning of a recording head and densities of patches recorded by the scanning of the recording head can be detected by similarly scanning the patches by means of the optical sensor.

Figure 14:
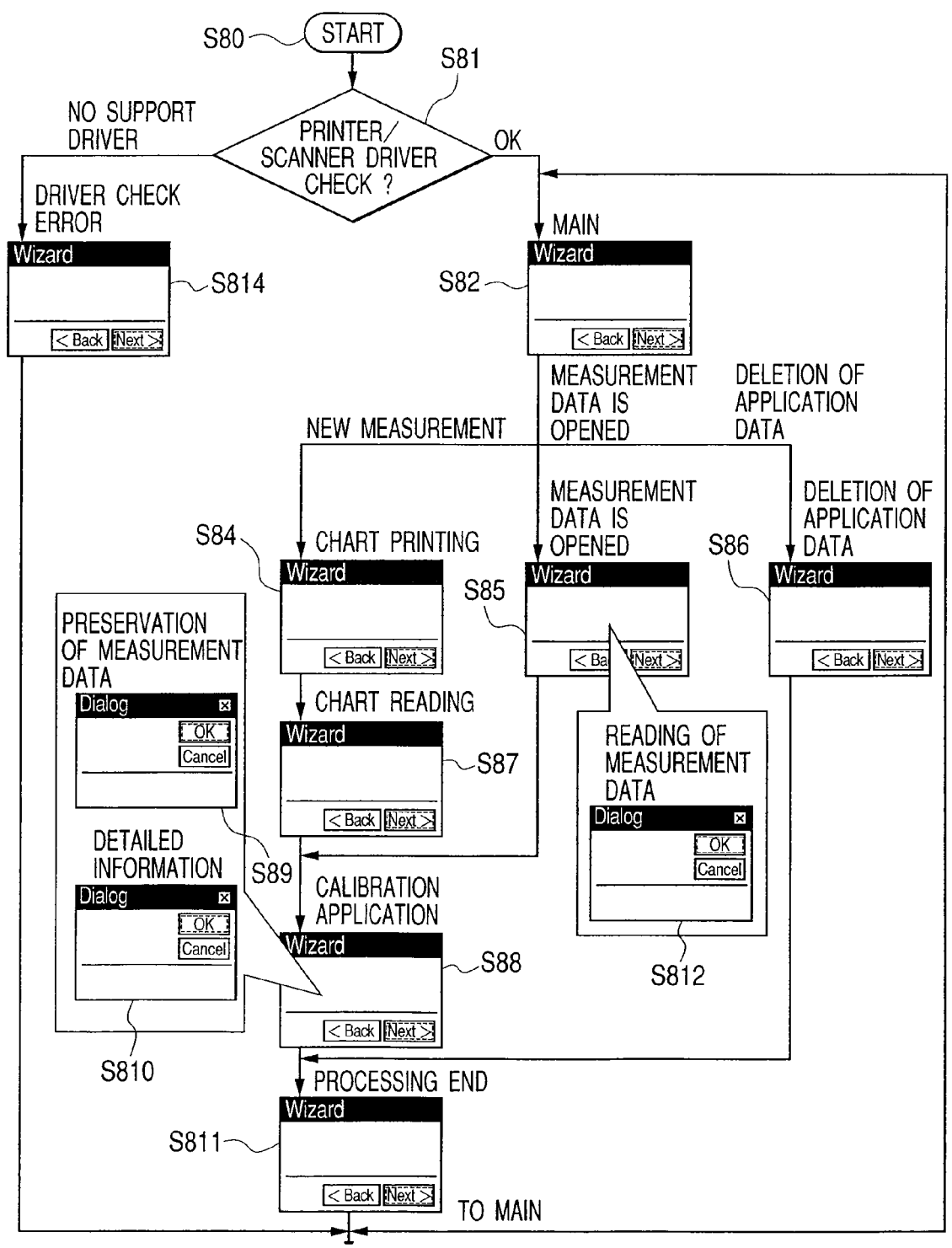
FIG. 14 is a view for explaining an operating procedure of calibration.

FIGS. 14 and 15 are views for explaining the calibration processing explained in connection with FIG. 2 to FIGS. 13A, 13B, 13C and 13D by using an operation screen (user interface (UI)) of the server PC 1. That is to say, the calibration according to the illustrated embodiment is constituted on the server PC 1 as certain application.

In a step S80 shown in FIG. 14, when the application is started, first of all, in a step S81, it is judged whether required printer driver/scanner driver are installed in the system of the server PC 1 or not. If the required drivers are not installed, in a step S814, a driver check error is displayed, and, in a step S813, the processing is ended. In the step S81, if it is judged that the required drivers are installed, in a step S82, a main screen is displayed.

An example of the main screen is shown in FIG. 15. Other screens fundamentally include "next", "return", "cancel" and "help" buttons as shown in FIG. 15 so that, when any button is depressed, the screen is changed to an associated screen. In the main screen shown in FIG. 14, as selection menu, there are provided three kinds, i.e., "new", "existing measurement data is opened" and "deletion of download data". Here, when "next" is selected and the "next" button is depressed, the processing is shifted to a step S84. In the step S84, the patch data is outputted to the printer 2. Then, in a step S87, as mentioned above, the densities of the patches printed out are measured in the scanner 3.

Then, in a step S88, calibration is applied. In this step, the processing operations in the steps S23 and S24 shown in FIG. 2, i.e., creation of the calibration data and download of the data to the printer 2 are effected. In the step S88, buttons for shifting to steps S89 and S810 are prepared so that, upon depression of any button, the processing can be shifted to the corresponding step. The step S89 includes a screen for effecting reservation of the measurement data and serves to reserve the scan data measured in the step S87. The saved data can be used in the processing using the existing measurement data (described later). The step S810 includes a screen for displaying detailed information and serves to display the detailed information such as the measured density characteristics. When leaving the steps S89 and S810, the processing is returned to the step S88. In a step S811, a processing end screen is displayed. In this screen, when end of application is designated, the processing is ended in the step S813; whereas, if "return to main screen" is designated, the processing is returned to the step S82.

If "measurement data is opened" is selected in the main screen of the step S82 and the "next" button is depressed, in a step S85, a screen for designating the measurement data is displayed. Here, by depressing a "reference" button, the processing is shifted to a measurement data reading screen in a step S812. In this case, it is possible to search the measurement data in detail. Incidentally, the measurement data is a data file reserved in the step S89. Then, in the step S88, the calibration is applied. Further processing operations are the same as the above-mentioned processing operations.

If "deletion of download data" is selected in the main screen of the step S82 and the "next" button is depressed, in a step S86, the calibration data stored in the calibration data storing portion 21 of the printer 2 is deleted. Although this is effected in response to the command from the server PC 1 to the printer 2, such command will not be referred to here. Then, the processing is shifted to the end screen (step S811). Further operations are the same as mentioned above.

As mentioned above, the present invention may be applied to not only a system constituted by a plurality equipments (for example, host computer, interface equipments, reader, printer and the like) but also an apparatus constituted by a single equipment (for example, copying machine, facsimile apparatus or the like).

Further, the present invention can be achieved by supplying a program code of software for executing the functions of the above-mentioned embodiment as shown in FIGS. 2, 7, 8 and 11 to a computer of a system or an apparatus to which various devices are connected to operate such devices thereby realize the functions of the embodiment and by operating the various devices in accordance with the program stored in the computer (CPU or MPU) of the system or the apparatus.

In this case, the program code itself of the software realizes the functions of the embodiment, and, thus, the program code itself and means for supplying the program code to the computer, for example, a storage medium storing such program code constitute the present invention.

As the storage medium for storing the program code, for example, a floppy disk, a hard disk, an optical disk, a photomagnetic disk, CD-ROM, a magnetic tape, a non-volatile memory card or ROM can be used.

Further, it should be noted that, when not only the functions of the above-mentioned embodiment are realized by executing the supplied program code by means of the computer but also the functions of the embodiment are realized by OS (operating system) running on the computer or in combination with other application, such program code is includes in an embodiment of the present invention.

Further, it should be noted that the present invention includes a concept that, after the supplied program code is written in a memory of a function expansion board inserted into the computer or a function expansion unit connected to the computer, a CPU of the function expansion board or of the function expansion unit executes the actual processing partially or totally on the basis of instruction of the program code to realize the functions of the embodiments.

What is claimed is:

1. An image processing method for generating data for print output, comprising:

a condition selection step, of selecting one of a plurality of half tone processing conditions usable for generating the data for print;

an information selection step, of selecting a piece of calibration information corresponding to the half tone processing condition selected in said condition selection step from among a predetermined number of pieces of calibration information stored in a storage unit, the predetermined number being smaller than the number of the half tone processing conditions;

a correction step, of correcting print output characteristics for the data by using the selected piece of calibration information; and a half tone processing step, of effecting half tone processing of the data corrected in said correction step under the half tone processing condition corresponding to the selected piece of calibration information.

2. A method according to claim 1, wherein the half tone processing is a dither method.

3. A method according to claim 2, wherein the plurality of half tone processing conditions are provided on the basis of different halftone patterns.

4. A method according to claim 1, wherein each piece of the calibration information is information of gamma correction table.

5. A program, stored in executable form in a computer-readable storage medium, for calibration processing for making print output characteristics of a print apparatus constant, said program including codes for executing processings comprising the steps of:

selecting one of a plurality of half tone processing conditions usable for generating the data for print output;

selecting a piece of calibration information corresponding to the selected half tone processing condition from among a predetermined number of pieces of calibration information stored in a storage unit, the predetermined number being smaller than the number of the half tone processing conditions;

correcting print output characteristics for the data by using the selected piece of calibration information; and effecting half tone image processing of the corrected data under the half tone processing condition corresponding to the selected piece of calibration information.

6. An image processing apparatus for generating data for print output, comprising:

a memory; and a processor constructed to execute instructions stored in the memory, to perform the steps of:

selecting one of a plurality of half tone processing conditions usable for generating the data for print output;

selecting a piece of calibration information corresponding to the selected half tone processing condition from among a predetermined number of pieces of calibration information stored in a storage unit, the predetermined number being smaller than the number of the half tone processing conditions;

correcting print output characteristics for the data by using the selected piece of calibration information; and effecting half tone processing of the corrected data under the half tone processing condition corresponding to the selected piece of calibration information.

\* \* \* \* \*